US010220343B2

United States Patent
Baek et al.

(10) Patent No.: US 10,220,343 B2
(45) Date of Patent: Mar. 5, 2019

(54) AIR FILTER FOR FUEL CELL VEHICLE

(71) Applicant: Hyundai Motor Company, Seoul (KR)

(72) Inventors: Sang-Cheol Baek, Gyeonggi-do (KR); Chan-Jung Jung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 122 days.

(21) Appl. No.: 15/346,894

(22) Filed: Nov. 9, 2016

(65) Prior Publication Data

US 2017/0239604 A1    Aug. 24, 2017

(30) Foreign Application Priority Data

Feb. 22, 2016    (KR) ........................ 10-2016-0020513

(51) Int. Cl.
*B01D 53/02*    (2006.01)
*B01D 46/00*    (2006.01)
*B01D 39/16*    (2006.01)
*H01M 8/0662*    (2016.01)

(52) U.S. Cl.
CPC ..... *B01D 46/0036* (2013.01); *B01D 39/1623* (2013.01); *B01D 46/0001* (2013.01); *H01M 8/0687* (2013.01); *B01D 2239/083* (2013.01); *B01D 2239/1216* (2013.01); *B01D 2239/1233* (2013.01); *B01D 2275/10* (2013.01); *H01M 2250/20* (2013.01)

(58) Field of Classification Search
CPC ...... B01D 2239/083; B01D 2239/1216; B01D 2239/1233; B01D 2275/10; B01D 39/1623; B01D 46/0001; B01D 46/0036; H01M 2250/20; H01M 8/0687
See application file for complete search history.

(56) References Cited

U.S. PATENT DOCUMENTS

| | | | | |
|---|---|---|---|---|
| 5,019,254 | A * | 5/1991 | Abrevaya | A01K 63/045 210/167.22 |
| 6,024,782 | A * | 2/2000 | Freund | B01J 20/28004 427/202 |
| 7,033,497 | B1 * | 4/2006 | Yamaguchi | B01D 39/1623 210/315 |
| 7,063,733 | B2 * | 6/2006 | Mori | A61L 9/014 55/385.3 |
| 2001/0052224 | A1 * | 12/2001 | Gelderland | B01D 39/18 55/521 |
| 2002/0088346 | A1 * | 7/2002 | Baracchi | B01D 53/02 96/134 |
| 2003/0089092 | A1 * | 5/2003 | Bause | B01D 39/2058 55/524 |

(Continued)

FOREIGN PATENT DOCUMENTS

JP    2004-305853 A    11/2004
JP    5080041 B2    11/2012
(Continued)

*Primary Examiner* — Christopher P Jones
(74) *Attorney, Agent, or Firm* — Mintz Levin Cohn Ferris Glovsky and Popeo, P.C.; Peter F. Corless (57) ABSTRACT

An air filter for a fuel cell vehicle may include a first filtration layer formed in a two-layered dust holding structure, a gas adsorption layer formed of amorphous activated carbon, a second filtration layer having amorphous pores formed therein, and a cover layer for maintaining a physical form of the air filter.

13 Claims, 6 Drawing Sheets

(56) References Cited

U.S. PATENT DOCUMENTS

| | | | | |
|---|---|---|---|---|
| 2004/0163540 | A1* | 8/2004 | Mori | A61L 9/014 |
| | | | | 96/134 |
| 2004/0255785 | A1* | 12/2004 | Koslow | A62B 23/02 |
| | | | | 96/154 |
| 2009/0261032 | A1* | 10/2009 | Gohle | A62B 23/00 |
| | | | | 210/490 |
| 2013/0032529 | A1* | 2/2013 | Hassler | B01D 39/2062 |
| | | | | 210/497.01 |
| 2014/0013957 | A1 | 1/2014 | Scope et al. | |
| 2015/0000233 | A1* | 1/2015 | Dai | B01D 39/1623 |
| | | | | 55/385.1 |
| 2016/0129383 | A1* | 5/2016 | Volk | B01D 46/0036 |
| | | | | 96/131 |

FOREIGN PATENT DOCUMENTS

| | | |
|---|---|---|
| KR | 2000-0066603 A | 11/2000 |
| KR | 20-0408567 Y1 | 2/2006 |
| KR | 2007-0107109 A | 11/2007 |

* cited by examiner

ABSTRACT

AIR FILTER FOR FUEL CELL VEHICLE

CROSS-REFERENCE TO RELATED APPLICATION

This application claims under 35 U.S.C. § 119(a) the benefit of Korean Patent Application No. 10-2016-0020513, filed on Feb. 22, 2016, the entire contents of which are incorporated by reference herein.

BACKGROUND (a) Technical Field

The present invention relates to an air filter for a fuel cell vehicle, more particularly, to an air filter for a fuel cell vehicle that can increase the running distance of the vehicle by increasing chemical holding capacity and dust holding capacity.

(b) Description of the Related Art

Figure 1:
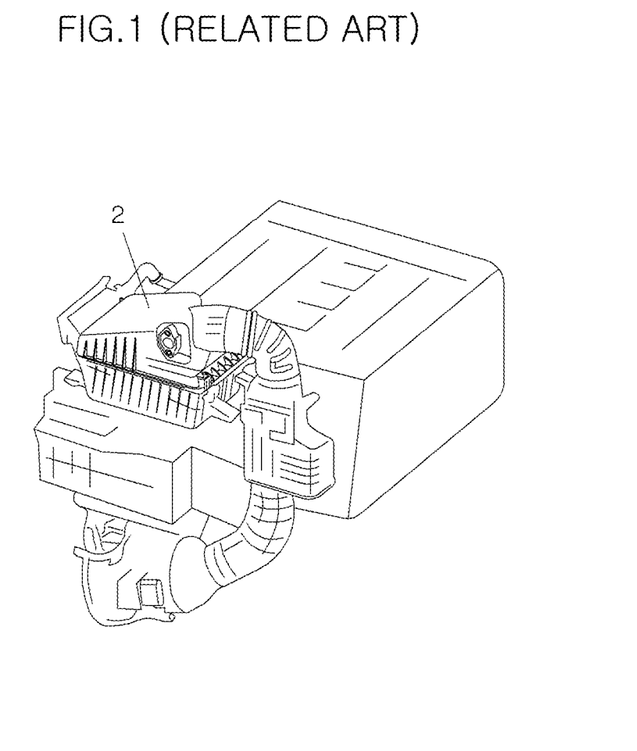
FIG. 1 (RELATED ART) is a schematic diagram of a typical air cleaner system.
Figure 2:
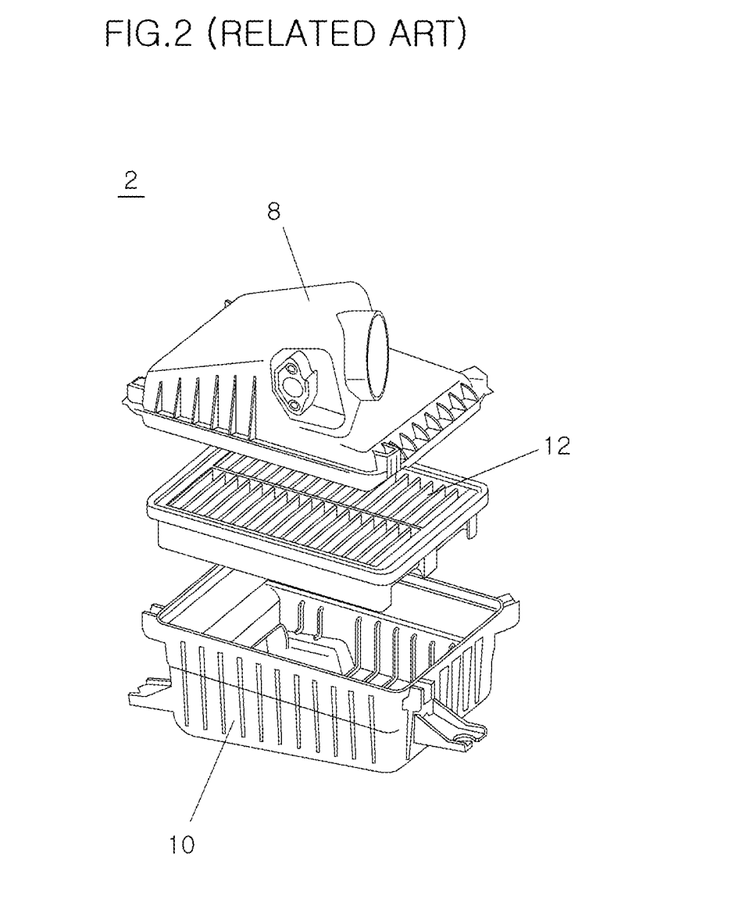
FIG. 2 (RELATED ART) is a diagram showing a conventional air cleaner assembly for fuel cell vehicles.

In general, in a typical structure of an air supply system of a vehicle, a silencer and an air cleaner 2 are included in the air supply system as separate individual parts, as shown in FIGS. 1-2 (RELATED ART), where the silencer functions to reduce noise that can occur during air intake and the air cleaner 2 functions to remove fine dust particles from the intake air.

Recently, significant research has been undertaken regarding fuel cell vehicles. A fuel cell is a device that converts chemical energy of fuel directly into electrical energy through a chemical reaction in the fuel cell, in which electricity is generated directly by an electrochemical reaction between hydrogen in the fuel and oxygen in the air.

Therefore, it is important for an air filter for a fuel cell vehicle to supply air into a fuel cell stack in a state in which fine dust particles and chemical contaminants such as sulfur dioxide ($SO_2$), toluene and butane are filtered off.

Figure 3:
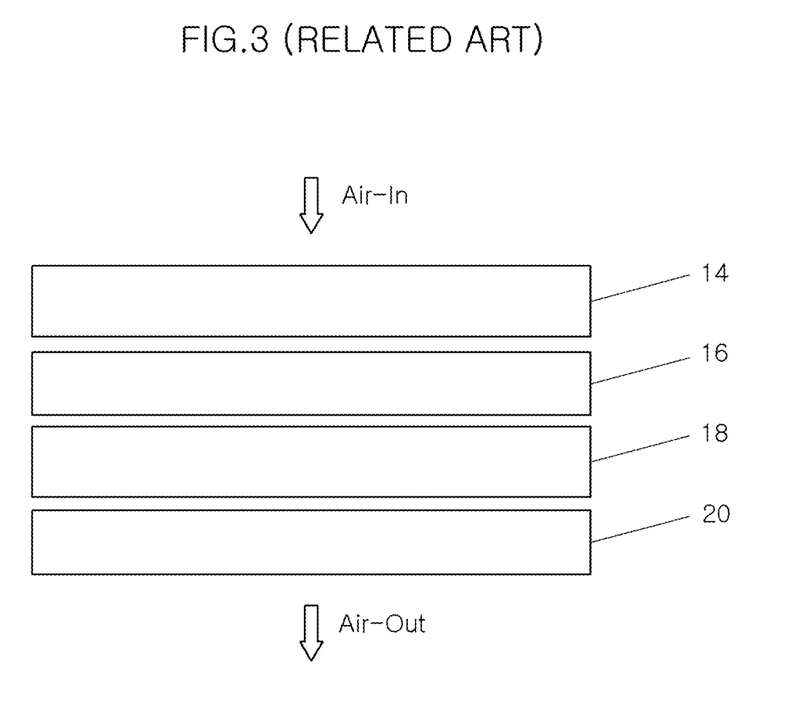
FIG. 3 (RELATED ART) is a diagram showing a sectional structure of layers of the conventional air filter for fuel cell vehicles.

Conventionally, in order to effectively filter off such contaminants, an air filter 12 made of nonwoven fabrics of a structure as shown in FIG. 3 (RELATED ART) has been mass-produced and used.

A conventional air filter 12 includes a first filtration layer 14 for primarily filtering off dust particles in the air, a gas adsorption layer 16 for holding chemical substances in the air, a second filtration layer 18 for secondarily filtering off dust particles in the air, and a cover layer 20 for additionally filtering off substances in the air and functioning to maintain a physical form of the air filter.

With the conventional air filter 12 of the above structure, since the nonwoven fabric material of the air filter 12 typically must be imported for use in making the filter, high material costs may result.

In addition, there is a problem that in a case where the air filter 12 is bent, gas holding efficiency thereof decreases while chemical holding capacity and dust holding capacity are also reduced, due to separation of carbon composing the gas adsorption (carbon) layer 16, and therefore the actual running distance of a fuel cell vehicle becomes shorter.

SUMMARY

An object of the present invention is to increase the running distance of fuel cell vehicles by increasing chemical holding capacity as well as dust holding capacity.

Other objects and advantages of the present invention can be understood by the following description, and become apparent with reference to the embodiments of the present invention. One aspect of the present invention provides an air filter for fuel cell vehicles, including: a first filtration layer formed in a two-layered dust holding structure; a gas adsorption layer formed of amorphous activated carbon; a second filtration layer having amorphous pores formed therein; and a cover layer for maintaining a physical form of the air filter.

In addition, another aspect of the present invention provides a method of manufacturing an air filter for fuel cell vehicles, including steps of: making a first filtration layer formed in a two-layered dust holding structure by a dry-laid nonwoven process; making a gas adsorption layer formed of amorphous activated carbon by a scattering process; making a second filtration layer having amorphous pores formed therein owing to binding of fibers by a melt blown process; and making a cover layer for maintaining a physical form of the air filter by a spunbond process.

Further, a further aspect of the present invention provides a method of operating an air filter for fuel cell vehicles, including steps of: removing primarily dust particles contained in the air introduced from the outside in a first filtration layer formed in a two-layered dust holding structure; adsorbing gas which was not removed in the first filtration layer in a gas adsorption layer formed of amorphous activated carbon; and removing fine dust particles in the air passing through the gas adsorption layer in a second filtration layer having amorphous pores formed therein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

It should be noted that various modifications to the embodiments of the present invention may be made and the scope of the invention should not be construed as being limited to the embodiments described in detail below. The present embodiments are given to more fully explain the present invention to those who have ordinary skill in the art. Therefore, shapes and the like of components may be exaggerated in the drawings in order to emphasize more clear explanation. It should also be noted that the same components are denoted by the same reference numerals throughout the drawings.

Figure 4:
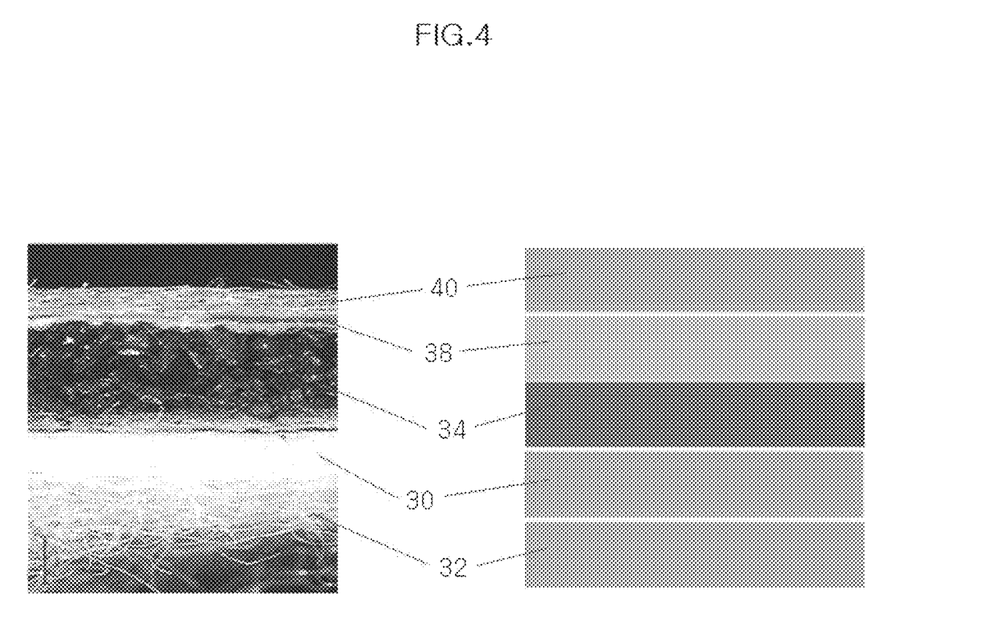
FIG. 4 is a tomogram and a diagram showing a sectional structure of layers of an air filter for a fuel cell vehicle, according to the present invention.
Figure 5:
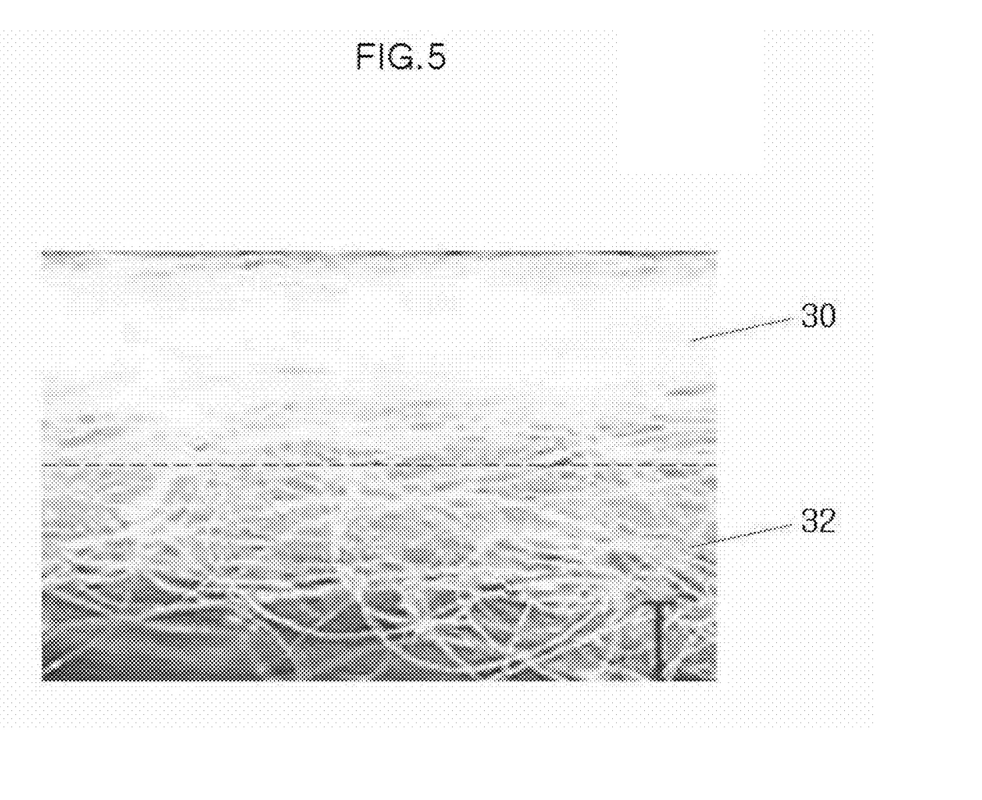
FIG. 5 is a tomogram of a second filtration layer according to the present invention.
Figure 6:
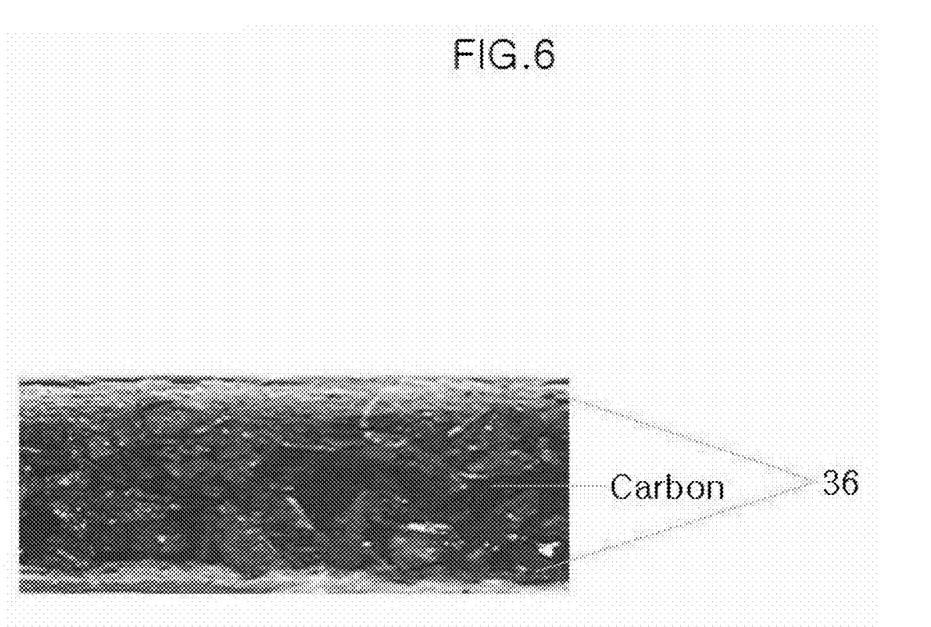
FIG. 6 is a tomogram of a gas adsorption layer according to the present invention.

FIG. 4 illustrates a tomogram and a diagram showing a sectional structure of layers of an air filter for a fuel cell vehicle, according to the present invention; FIG. 5 illustrates a tomogram of a second filtration layer according to the present invention; and FIG. 6 illustrates a tomogram of a gas adsorption layer according to the present invention.

A preferred embodiment of an air filter according to the present invention includes a first filtration layer 30 and 32 formed in a two-layered dust holding structure to remove dust; a gas adsorption layer 34 formed of amorphous activated carbon to adsorb gas such as sulfur dioxide ($SO_2$), toluene and butane in the air introduced from the outside; a second filtration layer 38 for removing dust particles with amorphous pores formed therein due to binding of fibers; and a cover layer 40 preferably made of polypropylene, in which the layers are stacked sequentially. Air introduced from the outside passes through the first filtration layer 30 and 32 at first.

The cover layer 40 may be manufactured by using a spunbond process, where the cover layer assists the second filtration layer 38 to remove dust particles and functions to maintain a physical form of the air filter.

The first filtration layer 30 and 32 may be manufactured by using a dry-laid nonwoven process, where the first filtration layer is made in such a manner that short fibers of polyethylene terephthalate material having a first diameter range and a second diameter range form upper and lower layers, respectively.

The lower layer 32 of the first filtration layer 30 and 32 is formed of fibers having a diameter of about 5 to 20 μm, where amorphous pores having a diameter of about 0.5 to 20 μm are formed therein, while the upper layer 30 of the first filtration layer 30 and 32 is formed of fibers having a diameter of about 20 to 150 μm, where amorphous pores having a diameter of 20 to 200 μm are formed therein.

A thickness of the first filtration layer 30 and 32 may be formed in such a manner that a ratio of thickness of the upper layer 30 to that of the lower layer 32 is approximately 9:1, and the upper and lower layers 30 and 32 are bonded to physically contact with each other.

The gas adsorption layer 34 is manufactured by using a scattering process, where the gas adsorption layer is made up mostly of carbon.

The gas adsorption layer 34 includes binders 36 of polyolefin material attached on top and bottom surfaces of the carbon. In other words, each of the binders 36 is formed in the form of a spider's web between the gas adsorption layer 34 and the second filtration layer 38 and between the gas adsorption layer 34 and the upper layer 30 of the first filtration layer, so that bonding of carbon particles becomes strong and thereby an adsorption rate of gas flowing into the gas adsorption layer 34 is increased.

The second filtration layer 38 may be manufactured by using a melt blown process, where the second filtration layer is formed of long fibers of polypropylene material.

A diameter of the long fibers may be about 5 to 150 μm, and thus, amorphous pores having a diameter of about 10 to 100 μm may be formed.

The first filtration layer 30 and 32 formed of polyethylene terephthalate material preferably is made up of an AL508 composition, while the second filtration layer 38 of polypropylene material preferably is made up of an AL508 composition and a TAC2000 composition that is a new material proposed in the present invention.

Physical properties of the first filtration layer 30 and 32 and the second filtration layer 38, which are configured as described above, are as follows:

A total weight of the first filtration layer 30 and 32 is about 710 $g/m^2$, charcoal weighs about 500 $g/m^2$ of the total weight, a thickness of the first filtration layer is about 2.1 to 2.6 mm, and air permeability of the first filtration layer satisfies a value of about 20 to 45 $cc/cm^2/sec$.

A total weight of the second filtration layer 38 is about 810 $g/m^2$; charcoal weighs about 500 $g/m^2$ of the total weight, thickness of the second filtration layer is about 3.5 to 4.2 mm, and air permeability of the second filtration layer satisfies a value of about 15 to 30 $cc/cm^2/sec$.

The air filter formed by stacking layers of materials, as described above, can filter air entering from the outside through steps of: removing primarily dust particles contained in the air introduced from the outside in the first filtration layer 30 and 32 formed in a two-layered dust holding structure; adsorbing gas which was not removed in the first filtration layer 30 and 32 in the gas adsorption layer 34 formed of amorphous activated carbon; and removing fine dust particles in the air passed through the gas adsorption layer 34 in the second filtration layer 38 having amorphous pores formed therein.

In a case where the air filter according to the present invention has the same specification as the conventional air filter shown in FIG. 3 except a layer stacking structure and composition composing the filter, comparison between performances of the conventional air filter and the air filter according to the present invention is as follows.

A dust holding capacity in the first filtration layer 30 and 32 composed of two layers according to the present invention is increased by 60% or more higher than the conventional first filtration layer 14 composed of a single layer. In addition, as the gas adsorption layer 34 according to the present invention includes binders 36, it is possible to prevent carbon from being separated when bending the air filter so that the gas adsorption layer can adsorb gas by 4.5% or more higher than the conventional gas adsorption layer 16.

Further, the second filtration layer 38 composed of TAC-2000 material according to the present invention can secure fine dust holding capacity of 99% or more, and thus, it is possible to increase the running distance of motor vehicles by virtue of an efficient dust holding capacity compared to the conventional air filter 12.

According to the present invention, there is an advantageous effect that both chemical holding capacity and dust holding capacity are increased and thereby the running distance of motor vehicles is increased.

In addition, there is also an advantageous effect that owing to the structure preventing carbon in the gas adsorption layer from being separated, it is possible to prevent carbon from being separated when bending the air cleaner filter so that gas adsorption efficiency is increased.

Further, there is also an advantageous effect that cost savings may be achieved by localizing materials for making the air filter.

The embodiments of the air filter for fuel cell vehicles according to the invention, as described above, are only illustrative and it will be appreciated by those who have ordinary skill in the art that various modifications can be made thereto and equivalent other embodiments can be derived therefrom.

While the present invention has been described with respect to the specific embodiments, it will be apparent to those skilled in the art that various changes and modifications may be made without departing from the spirit and scope of the invention as defined in the following claims.

Therefore, it will be well appreciated that the present invention is not limited only to configurations referred to in the detailed description as above. Consequently, the true technical protection scope of the present invention should be defined by the technical spirit of the appended claims. In addition, it should also be appreciated that the present invention covers all modifications, equivalents and alternatives falling within the spirit and scope of the invention defined by the appended claims.

What is claimed is:

1. An air filter for fuel cell vehicles, comprising:
   a first filtration layer formed in a two-layered dust holding structure;
   a gas adsorption layer formed of amorphous activated carbon;
   a second filtration layer having amorphous pores formed therein; and
   a cover layer for maintaining a physical form of the air filter,
   wherein the first filtration layer is formed in such a manner that short fibers having a first diameter range and a second diameter range form upper and lower layers, respectively.

2. The air filter of claim 1, wherein the gas adsorption layer comprises binders formed between the gas adsorption layer and the first filtration layer and between the gas adsorption layer and the second filtration layer.

3. The air filter of claim 1, wherein the second filtration layer is made up of long fibers of polypropylene.

4. The air filter of claim 3, wherein the long fibers are made up of fibers having a diameter of about 5 to 150 μm.

5. The air filter of claim 1, wherein pores of the second filtration layer are formed to have a dimension of about 10 to 100 μm.

6. The air filter of claim 2, wherein the binders of the gas adsorption layer are configured in the form of a spider's web.

7. The air filter of claim 1, wherein the first filtration layer comprises polyethylene terephthalate.

8. The air filter of claim 1, wherein the lower layer of the first filtration layer comprises fibers having a diameter of about 5 to 20 μm.

9. The air filter of claim 1, wherein the upper layer of the first filtration layer comprises fibers having a diameter of about 20 to 150 μm.

10. The air filter of claim 1, wherein the lower layer of the first filtration layer is formed with amorphous pores having a diameter of about 0.5 to 20 μm.

11. The air filter of claim 1, wherein the upper layer of the first filtration layer is formed with amorphous pores having a diameter of about 20 to 200 μm.

12. The air filter of claim 1, wherein the upper and lower layers of the first filtration layer are formed in such a manner that a ratio of thickness of the upper layer to that of the lower layer is 9:1.

13. The air filter of claim 1, wherein the upper and lower layers of the first filtration layer are bonded to physically contact with each other.

* * * * *